US010998816B1

(12) United States Patent
Payak

(10) Patent No.: US 10,998,816 B1
(45) Date of Patent: May 4, 2021

(54) ON-CHIP DETERMINATION OF CHARGE PUMP EFFICIENCY USING A CURRENT LIMITER

(71) Applicant: SanDisk Technologies LLC, Addison, TX (US)

(72) Inventor: Keyur Payak, Milpitas, CA (US)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 16/899,428

(22) Filed: Jun. 11, 2020

(51) Int. Cl.
*H02M 3/07* (2006.01)

(52) U.S. Cl.
CPC ...... *H02M 3/073* (2013.01); *H02M 2003/077* (2013.01)

(58) Field of Classification Search
None
See application file for complete search history.

(56) References Cited

U.S. PATENT DOCUMENTS

| 5,789,791 | A | 8/1998 | Bergemont |
| 6,081,889 | A * | 6/2000 | Kitao ........................ G06F 1/24 713/1 |
| 9,553,506 | B1 | 1/2017 | Huynh et al. |
| 9,653,126 | B2 | 5/2017 | Nguyen et al. |
| 9,810,723 | B2 | 11/2017 | Pan et al. |
| 10,283,207 | B2 | 5/2019 | Shin et al. |
| 10,763,838 | B2 * | 9/2020 | Im ........................ H02M 3/07 |

* cited by examiner

Primary Examiner — Jeffery S Zweizig
(74) Attorney, Agent, or Firm — Vierra Magen Marcus LLP

(57) ABSTRACT

Techniques and apparatuses are provided for determining the efficiency of a charge pump. A charge pump is driven during a measurement period without limiting its input current. The driving can include ramping up the output of the charge pump from an initial level to a final level and maintaining the output at the final level. A counter counts a number of clock pulses provided to the charge pump during the measurement period. Using a current mirror which limits the input current, a ratio of the current mirror is determined which results in a similar number of clock pulses during the measurement period. The ratio indicates an efficiency of the charge pump and can be used to set control parameters such as ramp up rate and clock frequency.

20 Claims, 10 Drawing Sheets

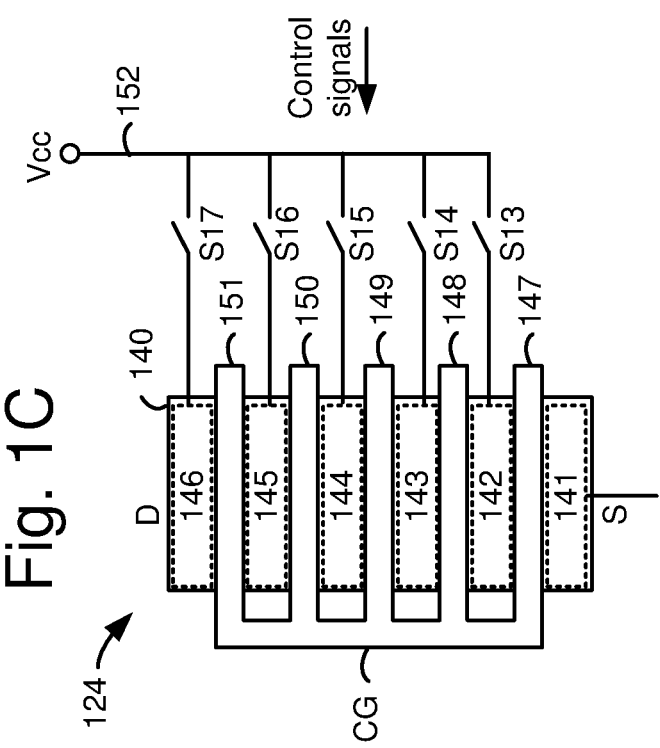

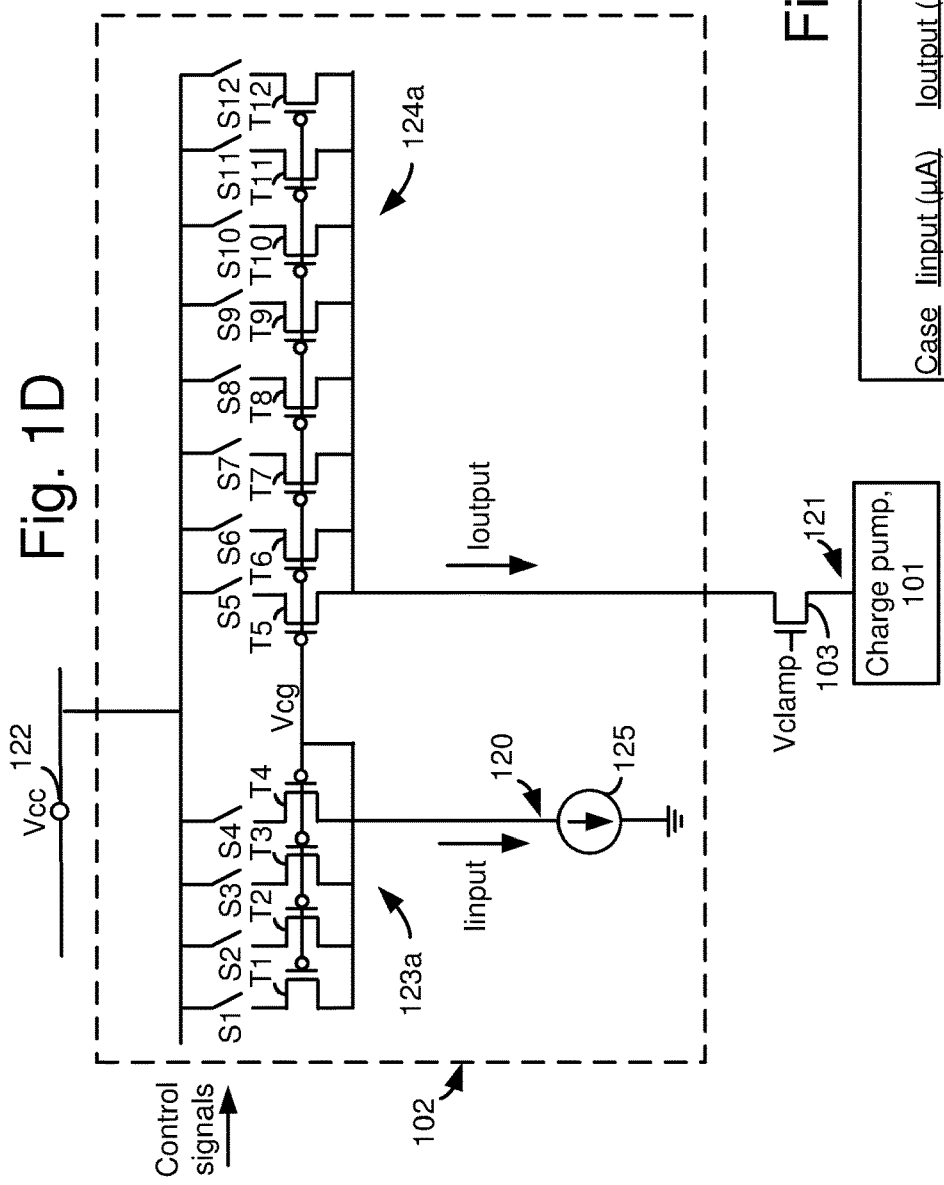

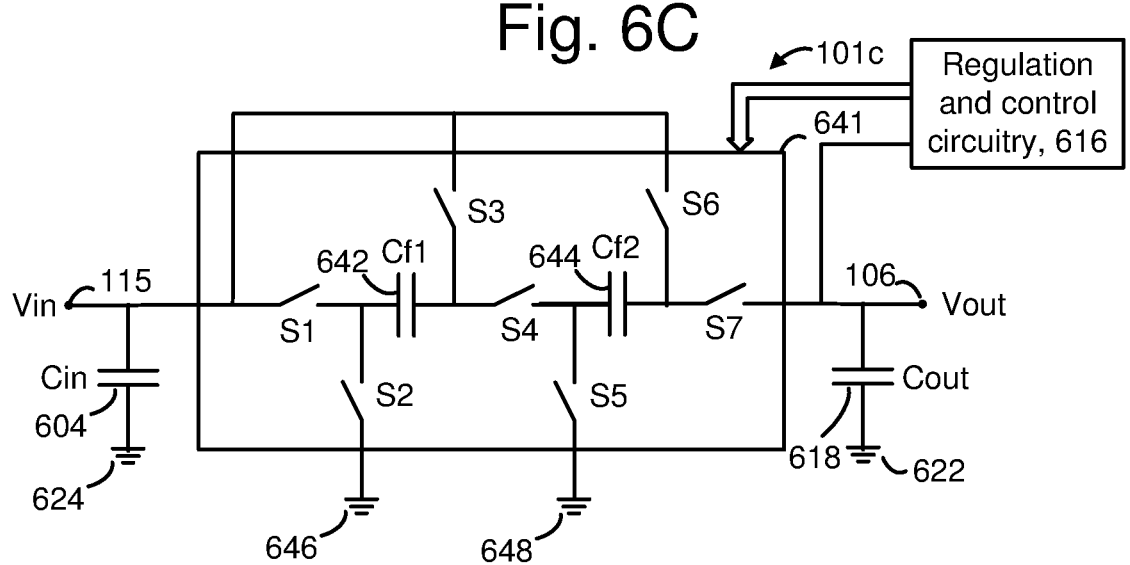
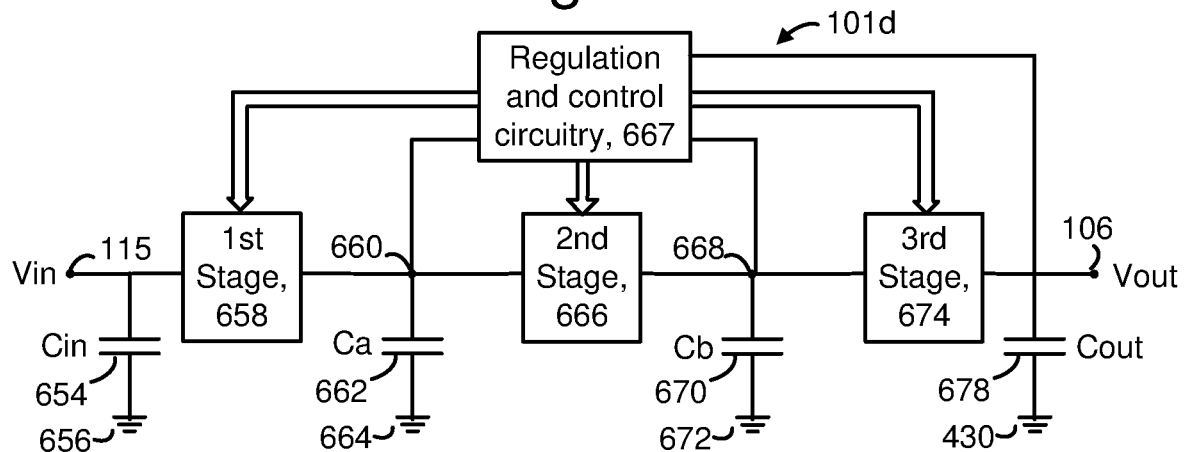

ON-CHIP DETERMINATION OF CHARGE PUMP EFFICIENCY USING A CURRENT LIMITER

BACKGROUND

The present technology relates to charge pumps.

Electronic devices often require regulated voltages in order to operate properly. Typically, a supply voltage of the device is provided to a voltage regulator which can translate the supply voltage to an output voltage at different levels. Various types of voltage regulators can be used. For example, a charge pump, or voltage converter, provides an output voltage which is different from the supply voltage. A charge pump typically uses capacitors as energy storage elements to provide an output voltage which is higher or lower than the supply voltage. Moreover, a charge pump can include voltage regulation circuitry to maintain the output voltage at a constant level.

BRIEF DESCRIPTION OF THE DRAWINGS

FIG. 1C depicts an example implementation of the variable transistor 124 of FIG. 1B as a multi-finger transistor.

FIG. 1D depicts an example implementation of the variable current source 102 of FIG. 1A using parallel transistors with switches.

FIG. 2 depicts a table showing the use of the transistor of FIG. 1C and the circuit of FIG. 1D to provide different currents to the input of a charge pump.

FIG. 6C depicts an example implementation of the charge pump 101 of FIG. 1A configured as a single-stage, multi-capacitor charge pump.

FIG. 6D depicts an example implementation of the charge pump 101 of FIG. 1A configured as a multi-stage charge pump.

DETAILED DESCRIPTION

Figure 1B:
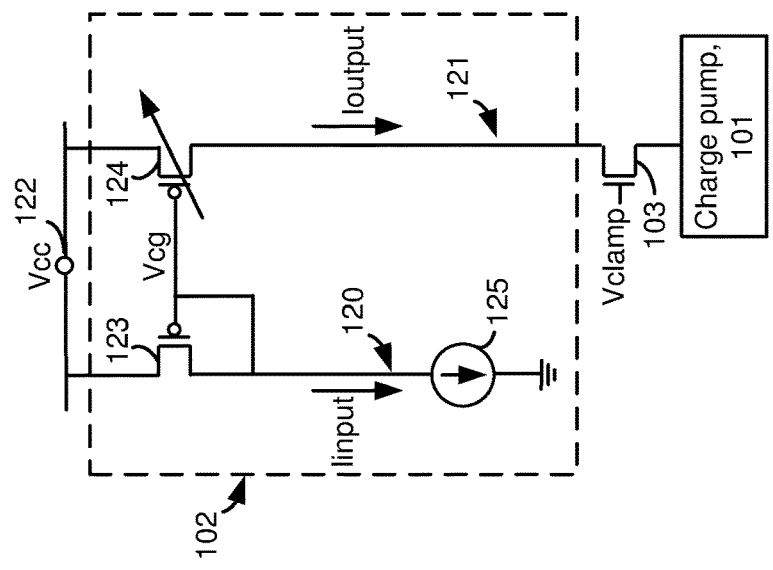
FIG. 1B depicts an example implementation of the variable current source 102 of FIG. 1A using a variable transistor 124.

Apparatus and techniques are provided for determining the efficiency of a charge pump on an integrated circuit or chip.

Charge pumps are used in semiconductor device to provide voltages at specified levels to components of the device. A charge pump generally refers to a switching voltage converter that converts an input voltage to a different output voltage. A charge pump includes a storage element such as a capacitor to repeatedly transfer charge from an input node to an output node according to a clock signal. The clock signal is used to control the timing of the opening and closing of switches which transfer the charge. A feedback mechanism may be used to regulate the output voltage at a specified level by alternately blocking the clock signal from reaching the charge pump and allowing the clock signal to reach the charge pump. Charge pumps typically consume a significant portion of the current consumption in a semiconductor device.

However, the efficiency of different charge pumps can vary due to variations in the semiconductor fabrication process, such as varying dimensions and doping levels. The efficiency can be expressed based on the amount of input current Iin which is required to provide an amount of output or load current Iload. For example, the efficiencies of multiple charge pumps on the same or different chips can vary from one another. To ensure that the charge pumps can meet performance requirements, control parameters such as ramp up and clock frequency can be set to accommodate the lowest expected efficiency. However, this results in a loss of performance for the higher-efficiency charge pumps.

Techniques and apparatuses provided herein address the above and other issues. In one approach, a charge pump is driven in a first instance of a measurement period such as by ramping up its voltage output from an initial level to a final level and maintaining the voltage output at the final level. A reference number of clock pulses (nREF) used by a clock source in driving the charge pump is determined. During the driving process, a current limiter connected to the input node of the charge pump is disabled and the charge pump receives a current from a power supply. Subsequently, the charge pump is driven in one or more additional instances of the measurement period while the current limiter is enabled and supplies a different current to the charge pump during each additional instance. A comparison number of clock pulses (nCOMP) used by the clock source in driving the charge pump in each of the additional instances is determined. The additional instances are completed once the comparison number of clock pulses matches, within a specified margin, the reference number of clock pulses. When the match occurs, the amount of charge pumped by the charge pump is substantially the same as in the first instance of the measurement period. In one approach, the current supplied by the current limiter increases over the additional instances until the match occurs.

The current limiter can comprise a variable-gain current mirror which has different gains to supply the different currents to the charge pump during each additional instance. The gain of the current mirror when the match occurs is an indication of the efficiency of the charge pump. Based on the efficiency, an optimal control parameter can be set for the charge pump. For example, if the efficiency is relatively high, a relatively high ramp up rate and/or clock frequency can be set. The efficiency information can be determined for one or more charge pumps on a chip. The information can be leveraged to gain performance and reduce current consumption.

In one approach, the process is performed once in the lifetime of a charge pump, such as at the time of manufacture. For example, the process, including determining the optimal control parameters, may occur during a die sort (testing) process for a chip on which the charge pump is fabricated. In another approach, the process can also be performed periodically over the lifetime and the optimal control parameters can be adjusted as the charge pump circuit ages. For example, the optimal ramp up time may become smaller and the optimal clock period may become longer as the charge pump circuit ages.

These and other benefits are further discussed below.

Figure 1A:
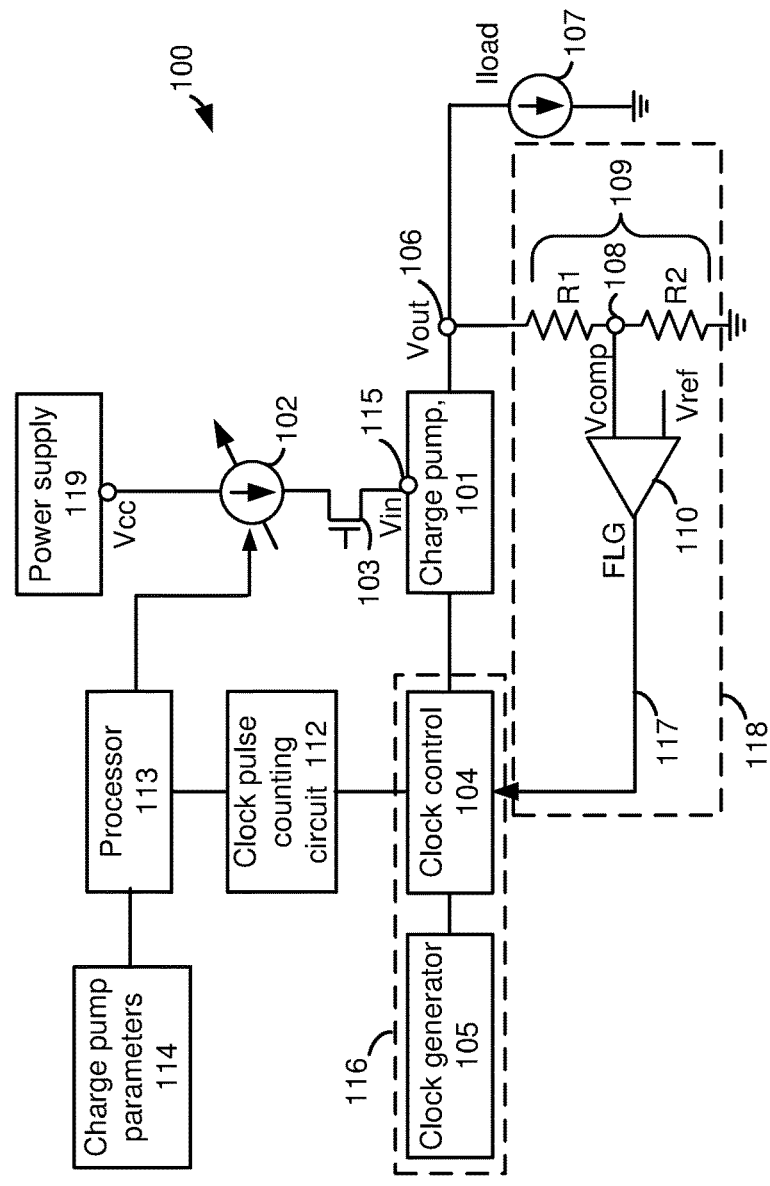
FIG. 1A depicts an example of a charge pump circuit 100 comprising a charge pump and associated circuitry to determine the efficiency of the charge pump.

FIG. 1A depicts an example of a charge pump circuit 100 comprising a charge pump 101 and associated circuitry to determine the efficiency of the charge pump. The charge pump circuit 100 is connected to a load such as a current load 107. The current load can be a fixed current sink such as 100 µA in the different measurement periods discussed herein. A current sink is an example of a DC load. Another example of a load is an AC load such as a capacitor. The load can represent a component in a circuit which operates using a specified input voltage. For example, in a memory device, the load can represent a word line, bit line or source line. The current load can optionally be connected to the output node 106 of a charge pump 101 by a switch to allow the current load to be connected when determining the efficiency and disconnected at other times during the normal operation of the charge pump 101.

The charge pump circuit 100 includes a clock source 116 which provides a clock signal constantly or alternatingly to the charge pump 101. The clock source 116, which is a circuit, includes a clock generator 105 which outputs a constant clock signal at a specified frequency to a clock control circuit 104. See FIG. 7A. The clock control circuit 104 provides a gating function to either block the signal from reaching the charge pump, or passing the clock signal to the charge pump. For example, the clock signal may be passed when the voltage output of the charge pump is below a desired voltage and blocked when the voltage output of the charge pump is above the desired voltage. The desired voltage can be a fixed level or an increasing level such as a ramp.

The clock signal is responsive to a feedback circuit 118 which includes a feedback path 117, a comparator 110 and a voltage divider 109. The voltage divider 109 divides the output voltage Vout using resistors R1 and R2 to provide a comparison voltage Vcomp at a node 108. R2 can be adjustable to provide voltage trimming. Vcomp is compared to a reference voltage Vref at the comparator 110 to set a flag FLG. FLG=0 if Vcomp>Vref and FLG=1 if Vcomp<=Vref. Note that Vcomp is a known fraction (R2/(R1+R2)) of Vout, so that a comparison of Vcomp to Vref by the comparator 110 is equivalent to a comparison of Vout to a specified output voltage.

When FLG=1, the clock control circuit 104 passes the clock signal to the charge pump 101 to operate the charge pump in a pumping mode, where charge is transferred from an input node 115 of the charge pump at an input voltage Vin to the output node 106. When FLG=0, the clock control circuit does not pass the clock signal to the charge pump, so that the charge pump operates in a non-pumping mode, where charge is not transferred from the input node to the output node. Vout will tend to decay in the non-pumping mode as the load is driven.

The charge pump circuit 100 also includes a clock pulse counting circuit 112 which is connected to the clock control circuit. The clock pulse counting circuit 112 is configured to count a number of clock pulses which are passed to the charge pump by the clock source 116 in a measurement period. The clock pulse counting circuit in turn is connected to a processor 113. The processor receives data from the clock pulse counting circuit regarding the number of clock pulses in a measurement period. The processor also provides commands to an adjustable or variable current source 102 which is connected to the input node 115 of the charge pump 101. The current source 102 can act as a current limiter. The commands can be used to set a current level at the input node. In one approach, the current source is a current mirror and the processor sets the current by setting a gain of the current mirror. Based on the current level and the count of clock pulses, the processor can determine an efficiency of the charge pump, as described further below. The processor can update and maintain charge pump parameters for the charge pump at a storage location 114. For example, the parameters can include ramp up rate or period and clock frequency or period. See also FIGS. 5A and 5B. Different charge pumps can have different efficiencies, even on the same chip, due to variations in the fabrication process. By determining the efficiency, the performance can be optimized.

The variable current source 102 receives a voltage (Vcc) from a power supply 119. A clamp transistor 103 can be used to clamp an input voltage at the node 115 to Vin, due to potential variations in Vcc. This ensures that the input voltage is fixed even if Vcc varies. The clamp transistor 103 may be an nMOSFET having a drain, control gate, and source, where a voltage at the source (Vin) is equal to the control gate voltage minus the threshold voltage (Vth) of the transistor.

FIG. 1B depicts an example implementation of the variable current source 102 of FIG. 1A using a variable transistor 124. The current source can be implemented as a current mirror, for example, having an input path 120 with a current Iinput and an output path 121 with a current Ioutput. Ioutput=Iinput×N, where N is a gain of the circuit. The input and output paths 120, 121 are both connected to the power supply at a node 122. When the current mirror is enabled, a current source 125 is used to set Iinput. This current is mirrored by transistors 123 and 124 to provide Ioutput. These transistors can be pMOSFETs, for example, whose control gates are connected to one another and have a voltage Vcg. In one approach, the transistor 124 is a variable transistor which is configured to provide a variable current, Ioutput, for a given level of Iinput, such as depicted in FIG. 1C. The transistor 124 is an example of a current limiter.

To disable the current limiter, a control signal is provided to turn off the current source 125. As a result, 0 V is provided at the control gate of the pMOS transistor 124 so that it is driven in an overdrive state in which it is fully conductive. In this case, the transistor 124 passes a current of the power supply from the node 122 without limiting the current. The charge pump can therefore draw as much current as is available from the power supply to meet the desired output voltage.

To enable the current limiter, a control signal is provided to turn on the current source 125. As a result, a non-zero, e.g., negative, voltage is provided at the control gate of the pMOS transistor 124 so that it is driven in a state in which it is partially conductive. In this case, the transistor 124 limits a current of the power supply from the node 122. The charge pump therefore draws a limited current according to the state of the transistor 124 and a gain of the current mirror.

The current mirror overall can also act as a current limiter, such as discussed in connection with FIG. 1D.

FIG. 1C depicts an example implementation of the variable transistor 124 of FIG. 1B as a multi-finger transistor 124. Generally, the size of a transistor, including its length and width, indicates an amount of current the transistor can pass between its source and drain. The larger the area, the larger the current. The length is in the vertical direction in the page and the width is in the horizontal direction. Based on this theory, a multi-finger transistor can be used in which a control gate CG has multiple fingers or branches 147-151 which extend on a substrate region 140. The substrate region has diffusion regions 141-146 on opposing sides of each finger. The diffusion regions 142-146 in turn are connected to respective switches S13-S17, which are connected to the power supply via a common conductive drain path 152. The switches can be switched on or off in response to control signals, e.g., from the processor 113. When a switch is switched on (provided in a conductive state), it provides a conductive path between the drain path 152 and the respective diffusion area. When a switch is switched off (provided in a non-conductive state), it does not provide a conductive path between the drain path 152 and the respective diffusion area. The diffusion region 141 provides a source terminal (S) of the transistor.

In use, one of the switches S13-S17 is turned on while the others remain off, to set the amount of current which will pass from the drain to the source. The diffusion region connected to the turned on switch becomes the drain terminal of the transistor. For example, the minimal current passed by the transistor occurs when S13 is turned on, and the diffusion region 142 is the drain terminal. S14-S17 are turned off so that current is not passed in the corresponding diffusion regions 143-146. The transistor 124 has its smallest length and size in this case. The size of the transistor in this case can be the same as the size of the transistor 123 in the input branch of the current mirror to provide a gain of one.

The maximum current passed by the transistor occurs when S17 is turned on, and the diffusion region 146 is the drain terminal. S13-S16 are turned off while current passes in the corresponding diffusion regions. The transistor has its largest length in this case. Any of the intermediate switches S14-S16 can be turned on to pass intermediate levels of current.

Figure 3:
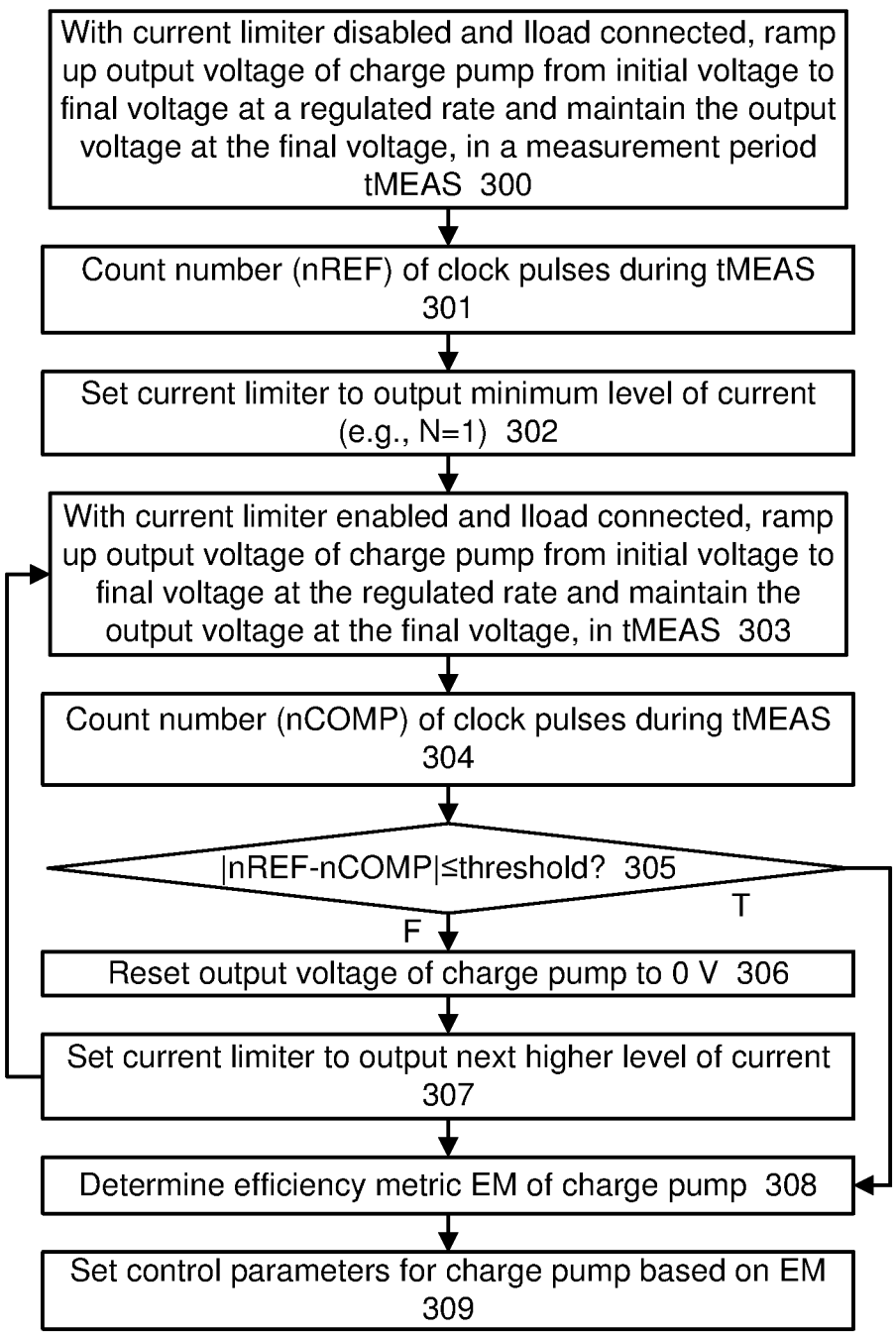
FIG. 3 depicts a flowchart of an example process for operating the charge pump circuit 100 of FIG. 1A to determine the efficiency of the charge pump.

In the process of FIG. 3 (discussed further below), the switches are turned on in a sequence from S13 to S17, one at a time, to provide increasingly greater currents, until the condition of step 305 is met.

FIG. 1D depicts an example implementation of the variable current source 102 of FIG. 1A using parallel transistors with switches. Each transistor can have a same size in one example, as this results in a simpler fabrication process. Although, different sized transistors could be used as well. The input path has a set 123a of four transistors T1-T4 connected to switches S1-S4, respectively, while the output path has a set 124a of eight transistors T5-T12 connected to switches S5-S12, respectively, Based on control signals, one or more switches can be turned on in the input and output paths. The gain of the current mirror is based on Nout/Nin, a ratio of a number of transistors Nout which are switched on in the output path to a number of transistors Nin which are switched on in the input path. Switching on a greater number of transistors is similar to having a transistor with a greater area. The switches are each connected to the power supply at the node 122.

In this case, the current mirror overall acts as a current limiter since Ioutput is limited based on which of the switches are turned on. To disable the current limiter, a control signal is provided to turn off the current source 125. As a result, Vcg=0 V is provided at the control gate of the pMOS transistors T1-T12 so that they are driven in an overdrive state in which they are fully conductive. One or more switches can be turned on for each of the two sets of switches S1-S4 and S5-S12. In this case, one or more of the transistors T1-T4 and one or more of the transistors T5-T12 pass a current of the power supply from the node 122 without limiting the current. If each transistor has the same size, the same number of transistors is turned on in the sets 123a and 124a.

To enable the current limiter, a control signal is provided to turn on the current source 125. As a result, a non-zero, e.g., negative, voltage is provided at the control gate of the pMOS transistors T1-T12 so that they are driven in a state in which they are conductive. One or more switches can be turned on for the set of switches S1-S4 to pass Iinput and one or more switches can be turned on for the set of switches S5-S12 to pass Ioutput. In this case, one or more of the transistors T1-T4 and one or more of the transistors T5-T12 limit a current of the power supply from the node 122. If each transistor has the same size, a greater number of transistors is turned on in the sets 124a than in the set 124a. The charge pump therefore draws a limited current according to the state of the transistors and a gain of the current mirror.

FIG. 2 depicts a table showing the use of the transistor of FIG. 1C and the circuit of FIG. 1D to provide different currents to the input of a charge pump. The table depicts five different cases in respective rows. The input current, Iinput=100 µA, as an example, in each case. For case 1, the gain of the current mirror circuit is 1, so that Ioutput=100 µA. This is achieved by turning on S13 in the transistor of FIG. 1C. As mentioned, this provides the smallest effective size for the transistor, equal to a size of the transistor 123, and a gain of one. Or, the gain=1 is achieved by setting the switches S1-S4 on and setting the switches S5-S8 on in the circuit of FIG. 1D. The gain=1 since the ratio Nout/Nin is 4/4=1.

In one approach, Ioutput for case 1 is equal to the load current, Iload.

For case 2, the gain of the current mirror circuit is 1.25, so that Ioutput=125 µA. This is achieved by turning on S14 in the transistor of FIG. 1C. This provides the second smallest effective size for the transistor. Or, the gain is achieved by setting the switches S1-S4 on and setting the switches S5-S9 on in the circuit of FIG. 1D, so that Nout/Nin is 5/4=1.25.

For case 3, the gain of the current mirror circuit is 1.5, so that Ioutput=150 µA. This is achieved by turning on S15 in the transistor of FIG. 1C. This provides the third smallest effective size for the transistor. Or, the gain is achieved by setting the switches S1-S4 on and setting the switches S5-S10 on in the circuit of FIG. 1D, so that Nout/Nin is 6/4=1.5.

For case 4, the gain of the current mirror circuit is 1.75, so that Ioutput=175 µA. This is achieved by turning on S16 in the transistor of FIG. 1C. This provides the fourth smallest effective size for the transistor. Or, the gain is achieved by setting the switches S1-S4 on and setting the switches S5-S11 on in the circuit of FIG. 1D, so that Nout/Nin is 7/4=1.75.

For case 5, the gain of the current mirror circuit is 2, so that Ioutput=200 μA. This is achieved by turning on S17 in the transistor of FIG. 1C. This provides the largest effective size for the transistor. Or, the gain is achieved by setting the switches S1-S4 on and setting the switches S5-S12 on in the circuit of FIG. 1D, so that Nout/Nin is 8/4=1.75.

FIG. 3 depicts a flowchart of an example process for operating the charge pump circuit 100 of FIG. 1A to determine the efficiency of the charge pump. Step 300 includes, with the current limiter disabled (off), and Iload connected to the output of the charge pump, ramping up an output voltage of a charge pump from an initial voltage to a final voltage at a regulated rate and maintaining the output voltage at the final voltage, in a measurement period tMEAS. See, e.g., FIG. 4A. This is a first instance of a measurement period.

Step 301 includes counting a number (nREF) of clock pulses during tMEAS. This can be performed by the clock pulse counting circuit 112 of FIG. 1A. Step 302 includes setting the current limiter to output a minimum level of current. This can involve configuring switches as in FIG. 2C, for example. For instance, the current limiter can be set with a gain N=1 to output the current of case 1 of FIG. 2. The current limiter is enabled since it limits the current at the input node of the charge pump.

Step 303 includes with the current limiter enabled (on), and Iload connected to the output of the charge pump, ramping up the output voltage of the charge pump from the initial voltage to the final voltage at the regulated rate and maintaining the output voltage at the final voltage, during tMEAS. See, e.g., FIGS. 4B and 4C. This represents one or more additional instances of the measurement period. Step 303 could represent a plurality of additional instances of the measurement period. Thus, the current passed by the current limiter starts at a minimum level in a first instance of a plurality of additional instances of the measurement period (e.g., a first pass of step 303) and increases in each remaining instance of the plurality of additional instances of the measurement period (e.g., second and subsequent passes of step 303).

The charge pump is requested by the control to provide the same output in steps 300 and 303. Note that other voltage waveforms can be provided other than a ramp up follow by a steady state output. For example, tMEAS can involve solely a ramping up, multiple steps up rather than a continuous ramp up, or solely a steady state output. A goal is to request an output which tests the pumping ability of the charge pump. Step 304 includes counting a number (nCOMP) of clock pulses during tMEAS. This is a comparison number of clock pulses which can be compared to the reference number of clock pulses (nREF) to determine an efficiency of the charge pump.

A decision step 305 determines whether |nREF−nCOMP|≤threshold, e.g., whether nREF matches nCOMP, within a threshold difference. For example, the threshold could be 1-5% or 1-10% of nREF. If the decision step 305 is false (F), step 306 resets the output voltage of the charge pump to 0 V. This avoids having any residual voltage at the output at the start of the next instance of the measurement period. Step 307 sets the current limiter to output a next higher level of current, e.g., by setting the gain or the current mirror to output a next higher level. The current supplied by the current limiter increases over the additional instances until the match occurs at step 305. For instance, step 307 can be implemented to provide the different gains of cases 2-5 of FIG. 2 in turn until the decision step 305 is true (T).

Note that each increase in the current in the additional instances of the measurement period (a second or later pass of step 303) can be equal or unequal. For example, FIG. 2 shows an equal increase of 50 uA for each additional instance of the measurement period. Also, it is possible to increase or decrease the current in the additional instances of the measurement period. In either case, a goal is to determine the lowest current for which step 305 is true.

Step 303 is repeated with the new current limiter setting. As mentioned, in one approach, the current limiter is set to output a current equal to Iload in step 302. It is possible that decision step 305 is true with Ioutput as low as Iload although typically, Ioutput is higher than Iload when decision step 305 is true. In some cases, Ioutput could be a multiple, e.g., two or three, of Iload. When step 305 is true, and nREF matches nCOMP, the amount of charge transferred in steps 300 and 303 also matches.

If the decision step 305 is true, step 308 determines an efficiency metric (EM) of the charge pump. Step 309 sets control parameters for the charge pump based on EM. See, e.g., FIGS. 5A and 5B. The setting of a control parameter can involve storing the control parameter in the storage location 114 of FIG. 1A.

In one approach, EM=N×nCOMP×tPMPCLK×DC/tMEAS. N is the gain of the current mirror, nCOMP is the count of clock pulses from step 304, tPMPCLK is the charge pump clock period (see FIG. 7A), DC is the duty cycle and tMEAS is the measurement time period in which the clock pulses are counted. The duty cycle is the ratio of charging time to the switching cycle time for the charge pump. Typically, DC is 50% or 0.5 since that generally yields the optimal charge transfer efficiency. A lower value of EM represents a higher efficiency and can be achieved by a lower value of N and/or nCOMP. N and/or nCOMP by themselves can also be considered to be efficiency metrics.

The derivation of EM is as follows. Assume that EM=Iinput/Iload. This equation can be written in terms of charge Q transferred by the charge pump as EM=Qin/Qload for a given time of tMEAS. For a current mirror gain of N, Qin=N*Qload. But, charge is only transferred every time the pump clock is high. So, the total charge transferred is: N*nCOMP*tPMPCLK*Qload. Also, the charge transferred is proportional to the duty cycle DC. If the duty cycle is 50%, the charge transfer occurs during only one half cycle of the pump clock period tPMPCLK. Accordingly, we multiply the above equation by DC=0.5. To obtain an average charge transfer, we divide by tMEAS. The result is: Qin=Qload*N*nCOMP*tPMPCLK*DC/tMEAS, or Qin/Qload=EM=N*nCOMP*tPMPCLK*DC/tMEAS.

The charge pump will operate normally, after the optimum charge parameters are set using the process of FIG. 3, with its current limiter disabled.

In an example implementation of FIG. 3, assume a circuit is configured to: in a first instance of a measurement period, count a reference number of clock pulses (nREF) used when driving the charge pump with the current limiter disabled; and for each instance of a plurality of additional instances of the measurement period, count a comparison number of clock pulses (nCOMP) used when driving the charge pump with the current limiter enabled, where the current limiter supplies a different current in each instance of the plurality of additional instances until the comparison number of clock pulses matching, within a specified margin, the reference number of clock pulses.

Further, the current passed by the current limiter starts at a minimum level in a first instance of the plurality of additional instances of the measurement period and increases in each remaining instance of the plurality of additional instances of the measurement period.

The current source may comprise a current mirror having an input path and an output path, where the current limiter is in the output path, and the particular current corresponds to a particular gain of the current mirror.

Figure 4A:
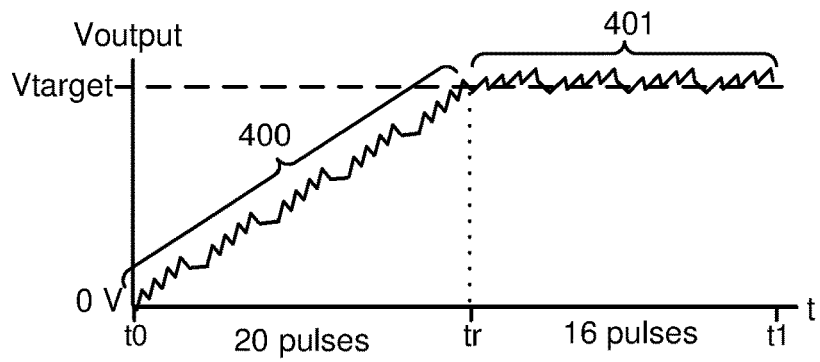
FIG. 4A depicts an example plot of output voltage (Voutput) versus time for a charge pump, where a current limiter is disabled.

For example, nREF=26 as in FIG. 4A. The current passed by the current limiter may start at a minimum level of 100 µA in a first instance of the plurality of additional instances of the measurement period. The remaining instances of the plurality of additional instances of the measurement period can include an instances with currents of 100 µA, 125 µA and 150 µA. Step 305 is true for the first time when the current reaches 150 µA.

Figure 4B:
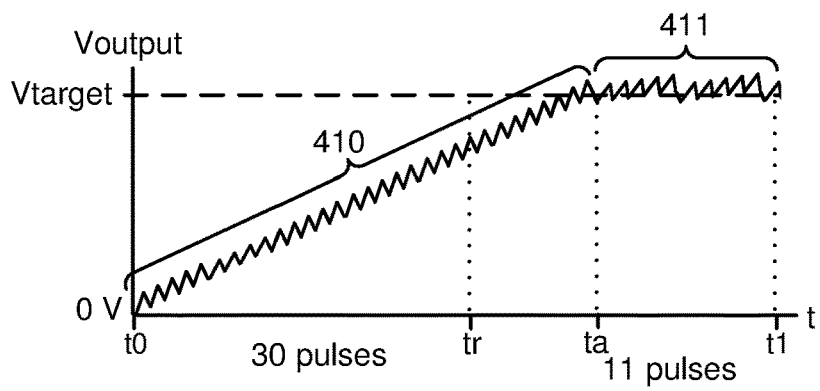
FIG. 4B depicts an example plot of Voutput versus time for a charge pump, where a current limiter is enabled and an input current to the charge pump is too low to meet the requested ramp up rate.
Figure 4C:
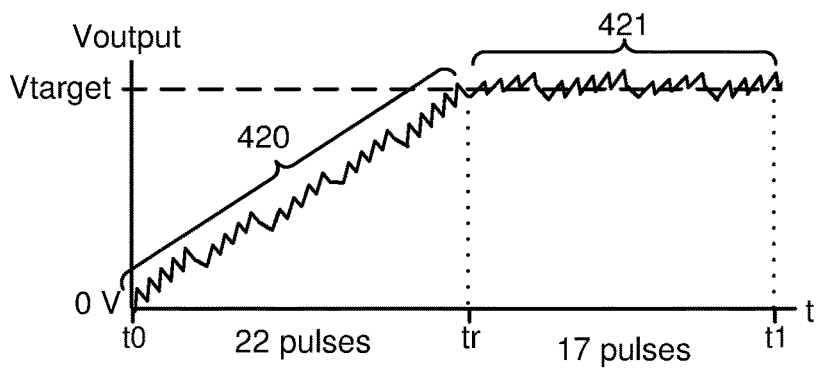
FIG. 4C depicts an example plot of Voutput versus time for a charge pump, where a current limiter is enabled, the input current to the charge pump is high enough to meet the desired ramp up rate, and the number of clock pulses is similar to the number in FIG. 4A.

In FIG. 4A-4C, the vertical axis depicts Voutput, the output voltage of the charge pump and the horizontal axis depicts time. Vtarget is a target steady state voltage. The sawtooth waveform represents charge transferred by the charge pump in successive clock periods when the charge pump is driven. Generally, the charge pump is regulated so that it cycles between a pumping and non-pumping mode to maintain the requested output voltage set by a control circuit, within a specified margin, e.g., no more than +/−10%. The charge pump cycles between pumping and non-pumping to maintain the output at the requested level.

FIG. 4A depicts an example plot of output voltage (Voutput) versus time for a charge pump, where a current limiter is disabled. Voutput is requested to increase from 0 V to Vtarget in a reference time period tr. In this example, the waveform 400 of the ramp up voltage includes 20 clock pulses from 0-tr and the waveform 401 of the steady state voltage includes 16 clock pulses. This example shows that nREF=20+16=36, consistent with step 301 of FIG. 3.

FIG. 4B depicts an example plot of Voutput versus time for a charge pump, where a current limiter is enabled and an input current to the charge pump is too low to meet the requested ramp up rate. Instead, a time period ta>tr is needed to ramp up the output voltage from 0 V to Vtarget. The waveform 410 of the ramp up voltage includes 30 clock pulses from 0-ta and the waveform 411 of the steady state voltage includes 11 clock pulses. nCOMP=30+11=41, consistent with step 304 of FIG. 3. In step 305, if the threshold is three clock pulses, this condition is not met since |36−41|=5. In one approach, Vtarget is the highest voltage output which is expected of the charge pump during its use on a chip. This approach results in evaluating the efficiency in a worst case scenario. Vtarget could be lower than the highest voltage output. It is also possible to test the efficiency for different levels of Vtarget and different ramp rates.

FIG. 4C depicts an example plot of Voutput versus time for a charge pump, where a current limiter is enabled, the input current to the charge pump is high enough to meet the desired ramp up rate, and the number of clock pulses is similar to the number in FIG. 4A. In this example, the input current is sufficient to meet the requested ramp up rate. The waveform 420 of the ramp up voltage includes 22 clock pulses from 0-tr and the waveform 421 of the steady state voltage includes 17 clock pulses. Accordingly, nCOMP=22+17=39 consistent with step 304 of FIG. 3. In step 305, if the threshold is three clock pulses, this condition is met since |36−39|=3. As mentioned, several tests may be made using different currents in different measurement instances, starting at a minimum level and incrementally increasing the level in each test, to determine the minimum level of current which results in step 305 being true. This can be the same as determining the minimum gain of a current mirror which results in step 305 being true.

In one approach, a circuit is configured to request the clock source to ramp up a voltage at the output node of the charge pump from an initial level to a final level at a regulated rate during the first instance of a measurement period and each instance of the plurality of additional instances of the measurement period.

Figure 5A:
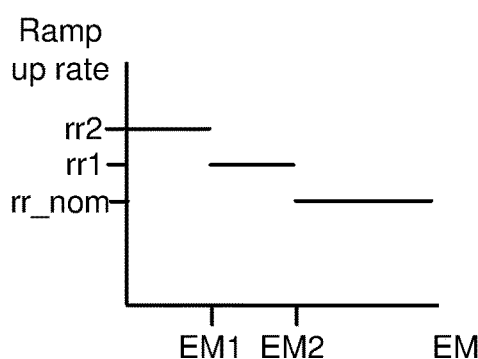
FIG. 5A depicts a plot of ramp up rate versus EM, an efficiency metric.

FIG. 5A depicts a plot of ramp up rate versus EM, an efficiency metric. As mentioned, the charge pump is more efficient when EM is lower. The ramp up rate, such as Vtarget/tr in FIG. 4A, can be set to a relatively high level when EM is relatively low. For example, the ramp up rate can be rr_nom, a nominal rate, when EM>EM2, an intermediate level of rr1 when EM1<EM≤EM2 and a highest level of rr2 when EM≤EM1, where rr2>rr1>rr_nom. The ramp up period could similarly be adjusted, where the ramp up period is relatively short when EM is relatively low.

Figure 5B:
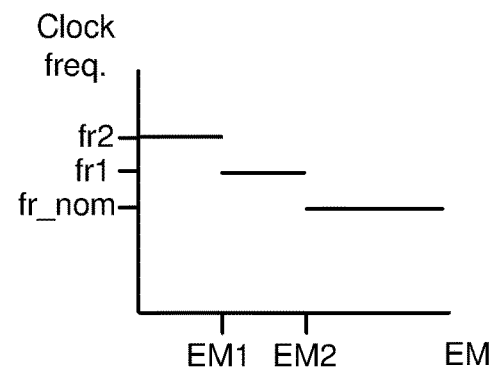
FIG. 5B depicts a plot of clock frequency versus EM.

FIG. 5B depicts a plot of clock frequency versus EM. The clock frequency (see also FIGS. 7A and 7B) can be set to a relatively high level when EM is relatively low. For example, the clock frequency can be fr_nom, a nominal rate, when EM>EM2, an intermediate level of fr1 when EM1<EM≤EM2 and a highest level of fr2 when EM≤EM1, where fr2>fr1>fr_nom. The clock period could similarly be adjusted, where the clock period is relatively short when EM is relatively low. In one option, both ramp up rate and clock frequency are adjusted. The charge pump parameters can therefore be optimized for a charge pump based on its efficiency. For example, if a charge pump has an above-average efficiency, its performance can be improved by increasing its ramp up rate and/or clock frequency. This can reduce the time used in a program, read or erase operation in a memory device, for example. Other charge pump parameters such as duty cycle could potentially be optimized as well.

FIG. 6A to FIG. 6D provide example configurations of a charge pump (101 in FIG. 1A). As mentioned, a charge pump can use a capacitor to transfer charge from an input node to an output node. In one approach, a MOS (metal oxide semiconductor) capacitor is used. A capacitor can be formed by depositing a layer of metallic conductive material onto a layer of oxide that has been deposited or grown on a layer of semiconductor material, such as a semiconductor wafer, referred to as the body. The semiconductor material may be p-type or n-type, based on the polarity of the body, in which case the capacitor is referred to as being p-type or n-type, respectively. The top conducting layer may be considered to be a gate terminal, while the bottom conducting layer is a source, drain or bulk terminal. In one approach, a capacitor can be formed from a MOSFET by tying its drain, source and bulk terminal together and using the resulting device as a two-terminal device.

To be used as flying capacitor, the technology should provide an opportunity to connect the bulk terminal of the capacitor to a voltage different from that of a substrate. For standard digital technology (p-type substrate, no triple-well) an nMOS capacitor can be used, while for an n-type substrate, a pMOS capacitor can be used. For triple-well technology, any type can be used. For the follower configuration, one terminal is always grounded, so a pMOS or nMOS capacitor can be used.

Figure 6A:
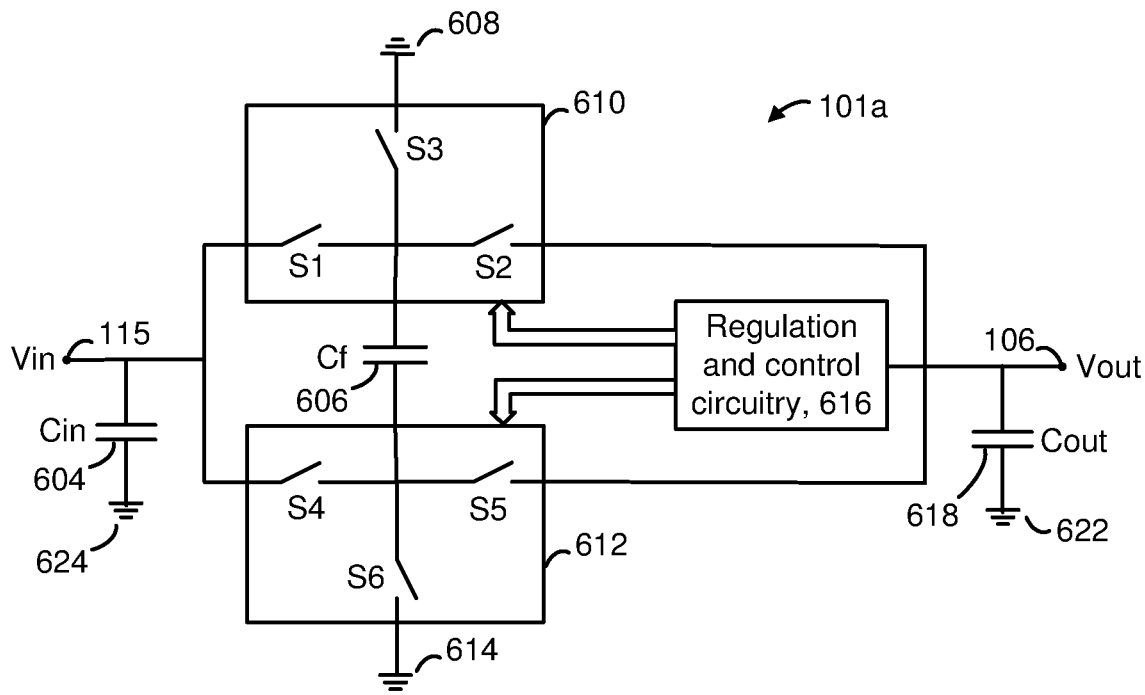
FIG. 6A depicts an example implementation of the charge pump 101 of FIG. 1A configured as a single-stage charge pump.

FIG. 6A depicts an example implementation of the charge pump 101 of FIG. 1A configured as a single-stage charge pump. A charge pump generally refers to a switching voltage converter that employs an intermediate capacitive storage element which is sometimes referred to as a flying capacitor or a charge transfer capacitor. One or more flying capacitors can be used. Moreover, a charge pump can include multiple stages connected in series to obtain special features such as a high output voltage and a greater range of output voltages. A charge pump can be constructed or configured for providing voltage conversion for applications including: multiplier, divider, inverter and follower. The principles discussed herein can be applied to one or more stages, and to one or more capacitors in a stage. The charge pump 101a is a generalized embodiment which can be controlled for multiplier, divider, inverter and follower applications. The charge pump 101a includes an input node 115 at which an input voltage (Vin) is applied. For example, Vin may be equal to a fixed power supply voltage sometimes referred to as Vdd or Vcc in a semiconductor chip. Or, Vin may be a clamped voltage which is lower than the power supply voltage, as in FIG. 1A. Charge from the voltage is maintained in an input capacitor Cin 604 which is connected to a ground node 624.

A first set of switches 610 and a second set of switches 612 are controlled by regulation and control circuitry 616 to transfer charge from the input node 115 to a flying capacitor Cf 606, and from Cf 606 to an output node 106. Vout is a resulting voltage at the output node 106, and can be greater than or less than Vin. The output node is coupled to an output capacitor Cout 618, which is connected to a ground node 622. The first set of switches 610 includes switches S1, S2 and S3 which are star-connected to one terminal (such as the top conductor) of Cf. The switches may be MOSFETs, bipolar junction transistors, relay switches, or the like. S1 connects the top conductor of Cf to the input node 115 to receive a charge from Vin. S2 connects the top conductor of Cf to the output node 106 to transfer its charge to the output node. S3 connects the top conductor of Cf to a ground node 608. Similarly, the second set of switches 612 includes switches S4, S5 and S6 which are star-connected to another terminal (such as the bottom conductor) of Cf S4 connects the bottom conductor of Cf to the input node 115 to receive a charge from Vin. S5 connects the bottom conductor of Cf to the output node 106 to transfer its charge to the output node. S6 connects the bottom conductor of Cf to a ground node 614.

Generally, the charge pump operation includes two main phases: charging Cf from the input node, and discharging Cf into the output node. During each phase, one of the switches in each set of switches is closed, connecting Cf to either the input node, the output node, or a ground node. Further, the regulation and control circuitry 616 provides the switches with appropriate control signals, including frequency, phases, amplitudes, delays, etc., depending on the particular application. The regulation and control circuitry 616 may communicate with the output node 106 as well such as to detect its level. Note that the circuits shown are examples only, as various modifications can be made.

Figure 6B:
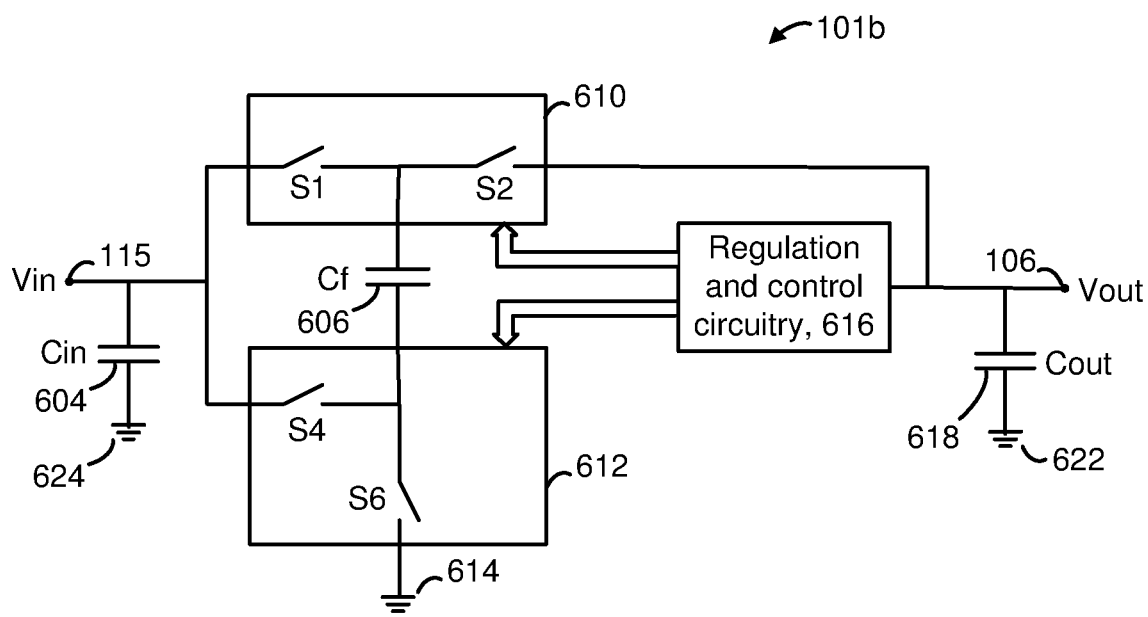
FIG. 6B depicts an example implementation of the charge pump 101 of FIG. 1A configured as a voltage multiplier.

FIG. 6B depicts an example implementation of the charge pump 101 of FIG. 1A configured as a voltage multiplier. A voltage multiplier, or step-up charge pump, in general, provides Vout>Vin. In this configuration, the voltage multiplier provides 2×Vin>Vout>Vin, and the switches S3 and S5 of FIG. 6A are not needed. In a charging phase, the regulation and control circuitry 616 provides the switches with appropriate control signals so that S1 is closed, e.g., conductive, and S2 is open, e.g., non-conductive, so that Cf is charged via S1. Further, S4 is open and S6 is closed so that the bottom conductor of Cf is connected to the ground node 614. In a discharging phase, S1 is open and S2 is closed, so that Cf is discharged, at least in part, to the output node 106 via S2. Further, S4 is closed and S6 is open.

FIG. 6C depicts an example implementation of the charge pump 101 of FIG. 1A configured as a single-stage, multi-capacitor charge pump. In this example, multiple flying capacitors are provided in a single stage. While two capacitors are provided as an example, more than two may be used. There are many possible charge pump configurations with multiple flying capacitors. The charge pump 101c is configured as a voltage multiplier in which Vout≈3×Vin. Capacitors Cf1 642 and Cf2 644 are provided. A set of switches 641 includes switches S1 to S7. S2 and S5 are connected to ground nodes 646 and 648, respectively. During a charging phase, switches S2, S3, S5, and S6 are closed, while S1, S4 and S7 are open, so that both flying capacitors Cf1 and Cf2 are connected in parallel and charged to the input voltage. During a discharging phase, switches S1, S4 and S7 are closed, and S2, S3, S5 and S6 are open, so that the flying capacitors are connected in series between the input node 115 and the output node 106. This effectively creates an output voltage of approximately three times the input voltage.

The use of multiple flying capacitors in a single stage can provide a ratio between Vout and Vin, e.g., Vout=1.5×Vin, 3×Vin, etc., or Vout=½×Vin, ⅓×Vin, etc. For greater flexibility, a multi-stage charge pump, such as described below, can be used.

FIG. 6D depicts an example implementation of the charge pump 101 of FIG. 1A configured as a multi-stage charge pump. Vin is provided at input node 115 so that Vout is obtained at an output node 106. As an example, three stages 658, 666 and 674 are provided. Two or more stages may be used. Each stage can include switches and one or more flying capacitors as discussed previously, for example. At the input, a capacitor Cin 654 is connected at one of its conductive layers to a ground node 656. At a node 660 which is between the first stage 658 and the second stage 666, a capacitor Ca 662 is connected at one of its conductive layers to a ground node 664. At a node 668 which is between the second stage 666 and the third stage 674, a capacitor Cb 670 is connected at one of its conductive layers to a ground node 672. Finally, at the output node 106, an output capacitor Cout 678 is connected at one of its conductive layers to a ground node 430. A multi-stage charge pump can provide greater flexibility in terms of providing a greater range of output voltages. Further, each stage can include one or more capacitors to provide even greater flexibility.

The multi-stage charge pump 101d is operated under the control of regulation and control circuitry 667 which controls switching in each stage. Note that it is also possible to provide regulation and control circuitry in each stage, additionally or alternatively. Charge is transferred from the input node 115 of the first stage to a flying capacitor (not shown) in the first stage 658, and from the flying capacitor of the first stage to the node 660. Charge is then transferred from the node 660 of the second stage to a flying capacitor (not shown) in the second stage, and from the flying capacitor of the second stage to the node 668. Charge is then transferred from the node 668 to a flying capacitor (not shown) in the third stage, and from the flying capacitor of the third stage to the output node 106, assuming there are no further stages.

Figure 7A:
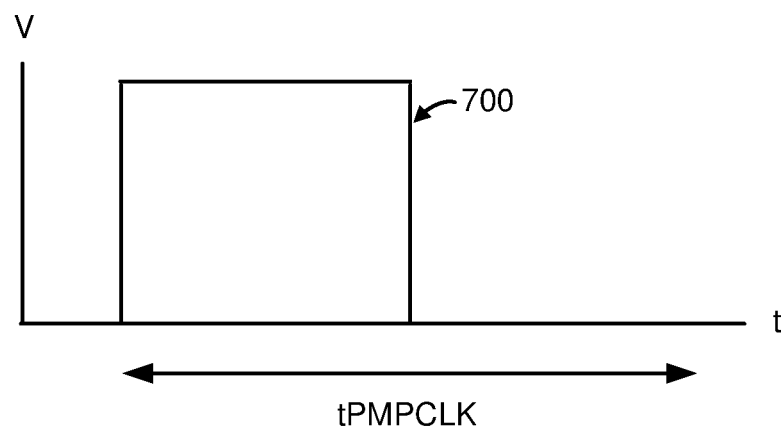
FIG. 7A depicts an example clock signal of a charge pump.

FIG. 7A depicts an example clock signal of a charge pump. A voltage of the signal is plotted versus time. As mentioned, regulation and control circuitry is used to provide switches in a charge pump with appropriate control signals, including frequency, phases, amplitudes, delays, etc., depending on the particular configuration. The control signals are set so that the one or more capacitors in the charge pump operate at desired operating points. Generally, the capacitor undergoes repeated cycles of charging and discharging in order to transfer charge from the input node to the output node. Thus, the applied voltage across the capacitor varies during charging and discharging. Note that Vin may be substantially constant during the charging and discharging.

The waveform 700 represent a clock pulse in a clock period tPMPCLK, and includes a high level and a low level. These levels can be of equal or different durations. The duration of the clock pulse relative to tPMPCLK is the duty cycle, as mentioned.

Figure 7B:
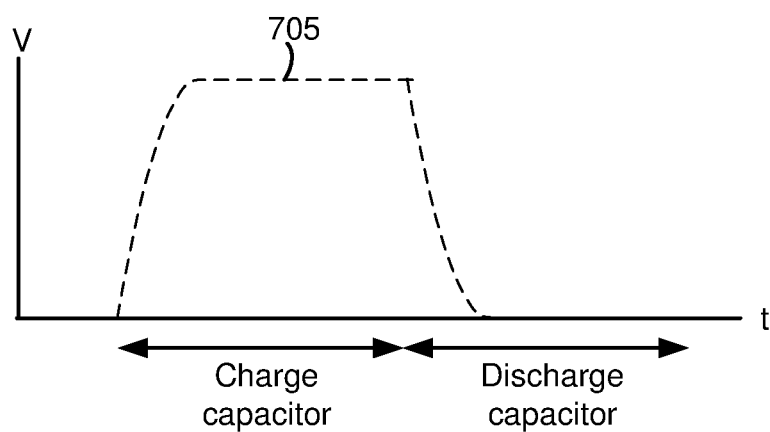
FIG. 7B depicts an example plot of a voltage of a flying capacitor in a charge pump during charging and discharging.

FIG. 7B depicts an example plot 705 of a voltage of a flying capacitor in a charge pump during charging and discharging. The voltage is plotted versus time and is time-aligned with the clock signal of FIG. 7A. The waveform 700 represent one clock period and includes a high level and a low level. In this example, charging of the capacitor occurs when the clock signal is high and discharging of the capacitor occurs when the clock signal is low.

Figure 8:
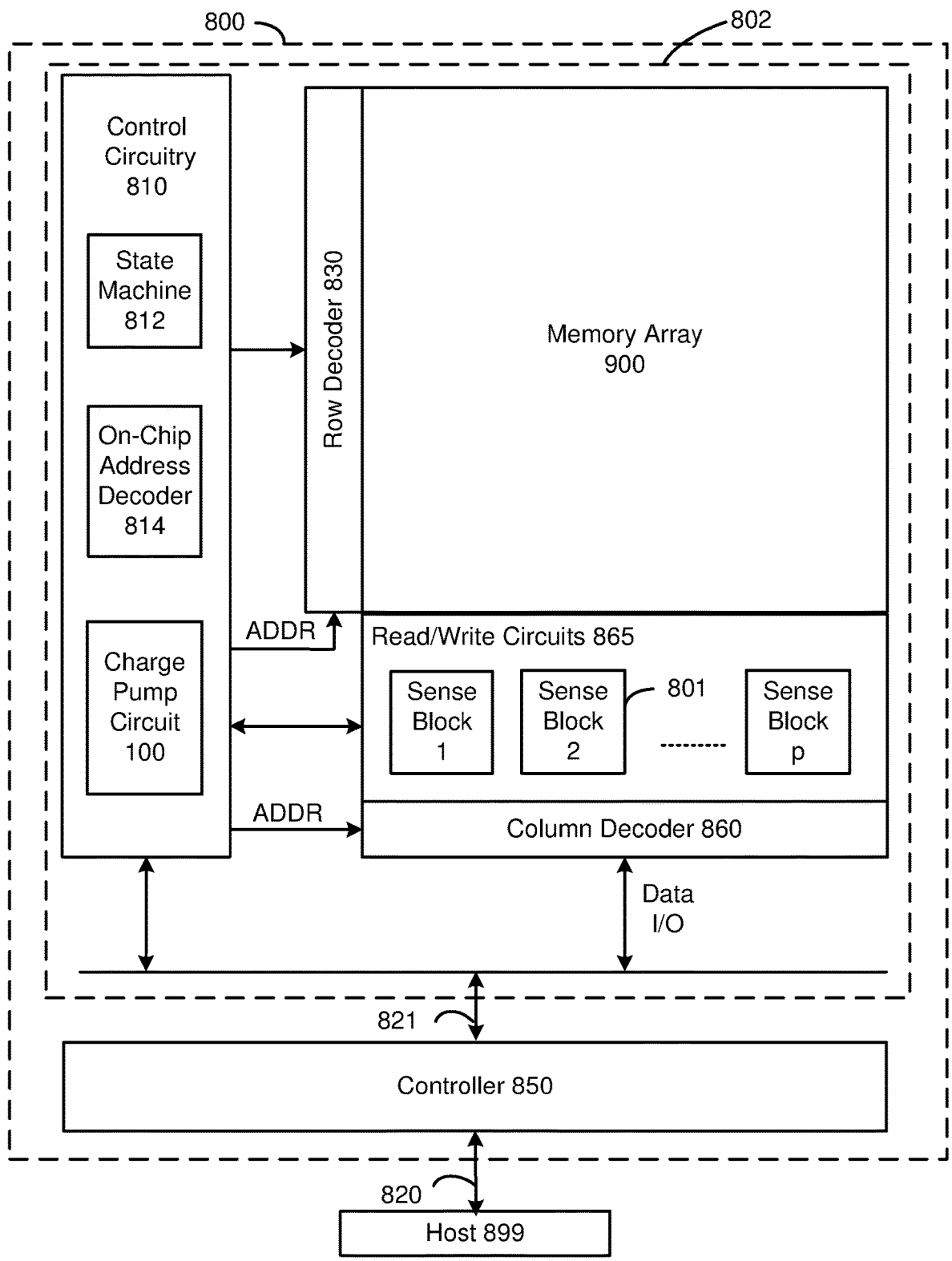
FIG. 8 is a block diagram of an example memory system including the charge pump circuit 100 of FIG. 1A.

FIG. 8 is a block diagram of an example memory system including the charge pump circuit 100 of FIG. 1A. The system may include many blocks of storage elements. See, e.g., FIG. 9. A memory device 800 has read/write circuits for reading and programming a page of storage elements in parallel, and may include one or more memory die 802. Memory die 802 includes an array 900 of storage elements, which may include several of the blocks 901 of FIG. 9, control circuitry 810, and read/write circuits 865. In some embodiments, the array of storage elements can be three dimensional. The memory array is addressable by word lines via a row decoder 830 and by bit lines via a column decoder 860. The read/write circuits 865 include multiple sense blocks 801 and allow a page of storage elements to be read or programmed in parallel. Typically an off-chip controller 850 is included in the same memory device (e.g., a removable storage card) as the one or more memory die 802. Commands and data are transferred between the host 899 and controller 850 via lines 820 and between the controller and the one or more memory die 802 via lines 821.

The control circuitry 810 cooperates with the read/write circuits 865 to perform operations on the memory array. The control circuitry 810 includes a state machine 812, an on-chip address decoder 814 and the charge pump circuit 100 of FIG. 1A, as discussed.

The state machine 812 provides chip-level control of memory operations. For example, the state machine may be configured to perform read and verify processes. The on-chip address decoder 814 provides an address (ADDR) interface between that used by the host or a memory controller to the hardware address used by the decoders 830 and 860. The charge pump circuit controls the power and voltages supplied to the word lines and bit lines during memory operations.

In some implementations, some of the components of FIG. 8 can be combined. In various designs, one or more of the components (alone or in combination), other than memory array 900, can be thought of as a managing or control circuit. For example, one or more managing or control circuits may include any one of, or a combination of, control circuitry 810, state machine 812, decoders 814 and 860, charge pump circuit 100, sense blocks 801, read/write circuits 865, controller 850, host 899, and so forth.

The data stored in the memory array is read out by the column decoder 860 and output to external I/O lines via the data I/O line and a data input/output buffer. Program data to be stored in the memory array is input to the data input/output buffer via the external I/O lines. Command data for controlling the memory device are input to the controller 850. The command data informs the flash memory of what operation is requested. The input command is transferred to the control circuitry 810. The state machine 812 can output a status of the memory device such as READY/BUSY or PASS/FAIL. When the memory device is busy, it cannot receive new read or write commands.

In another possible configuration, a non-volatile memory system can use dual row/column decoders and read/write circuits. In this case, access to the memory array by the various peripheral circuits is implemented in a symmetric fashion, on opposite sides of the array, so that the densities of access lines and circuitry on each side are reduced by half.

Figure 9:
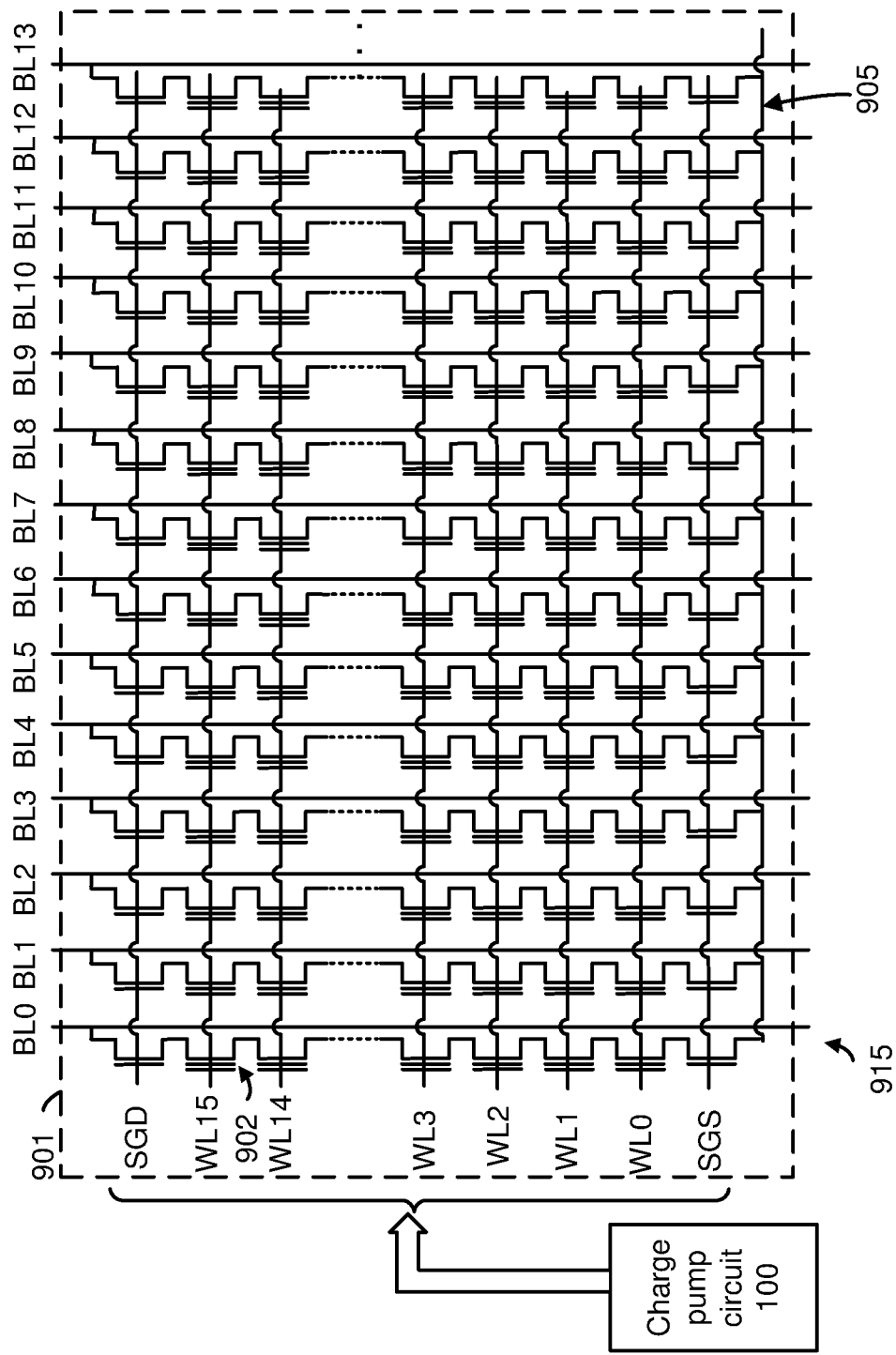
FIG. 9 depicts a block of memory cells in an example configuration of the memory array 900 of FIG. 8.

FIG. 9 depicts a block of memory cells in an example configuration of the memory array 900 of FIG. 8. A charge pump provides an output voltage which is different from a supply or input voltage. In one example application, the charge pump circuit 100 is used to provide voltages at different levels during erase, program or read operations in a non-volatile memory device such as a NAND flash EEPROM. In such a device, a block 901 of memory cells includes a number of storage elements which communicate with respective word lines WL0-WL15, respective bit lines BL0-BL13, and a common source line 905. An example storage element 902 is depicted. In the example provided, sixteen storage elements are connected in series to form a NAND string (see example NAND string 915), and there are sixteen data word lines WL0 through WL15. Moreover, one terminal of each NAND string is connected to a corresponding bit line via a drain select gate (connected to select gate drain line SGD), and another terminal is connected to a common source 905 via a source select gate (connected to select gate source line SGS). Thus, the common source 905 is coupled to each NAND string. The block 901 is typically one of many such blocks in a memory array.

In an erase operation, a high voltage such as 20 V is applied to a substrate on which the NAND string is formed to remove charge from the storage elements. During a programming operation, a voltage in the range of 15-25 V is applied to a selected word line. In one approach, step-wise increasing program pulses are applied until a storage element is verified to have reached an intended state. Moreover, pass voltages at a lower level may be applied concurrently to the unselected word lines. In read and verify operations, the select gates (SGD and SGS) are connected to a voltage in a range of 2.5 to 4.5 V and the unselected word lines are raised to a read pass voltage, Vread, (typically a voltage in the range of 4.5 to 6 V) to make the transistors operate as pass gates. The selected word line is connected to a voltage, a level of which is specified for each read and verify operation, to determine whether a Vth of the concerned storage element is above or below such level.

In practice, the output of a charge pump may be used to provide different voltages concurrently to different word lines or groups of word lines. It is also possible to use multiple charge pumps to supply different word line voltages. Similarly, the output from a charge pump can be provided to a bit line or other location as needed in the memory device.

Accordingly, in one embodiment, an apparatus comprises: a charge pump comprising an input node and an output node; a current limiter connected to the input node; a clock source connected to the charge pump, the clock source is configured to drive the charge pump with clock pulses; and a circuit connected to the clock source, the circuit is configured to: in a first instance of a measurement period, count a reference number of clock pulses used when driving the charge pump with the current limiter disabled; and for each instance of a plurality of additional instances of the measurement period, count a comparison number of clock pulses used when driving the charge pump with the current limiter enabled, the current limiter supplies a different current in each instance of the plurality of additional instances until the comparison number of clock pulses matches, within a specified margin, the reference number of clock pulses.

In another embodiment, a method comprises: supplying a current from a power supply to an input node of a charge pump while a current load is connected to an output node of the charge pump; during the supplying of the current from the power supply, driving the charge pump with clock pulses during a first instance of a measurement period without limiting the current supplied from the power supply to the input node; counting a reference number of clock pulses used when driving the charge pump during the first instance of the measurement period; supplying a current from a current mirror to the input node of the charge pump while the current load is connected to the output node; determining a minimum gain of the current mirror which allows for driving the charge pump with a comparison number of clock pulses in another instance of the measurement period which matches, within a specified margin, the reference number of clock pulses; and determining a control parameter of the charge pump based on the minimum gain.

In another embodiment, an apparatus comprises: a charge pump comprising an input node and an output node; a current mirror comprising an input path and an output path, the output path is connected to the input node; and a circuit connected to the current mirror, the circuit is configured to: in a first instance of a measurement period, count a reference number of clock pulses used when driving the charge pump with the current mirror disabled; and for each instance of a plurality of additional instances of the measurement period, count a comparison number of clock pulses used when driving the charge pump with the current mirror enabled, the current mirror has a different gain in each instance of the plurality of additional instances, until the comparison number of clock pulses matches, within a specified margin, the reference number of clock pulses.

The foregoing detailed description of the invention has been presented for purposes of illustration and description. It is not intended to be exhaustive or to limit the invention to the precise form disclosed. Many modifications and variations are possible in light of the above teaching. The described embodiments were chosen to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. An apparatus, comprising:
    a charge pump comprising an input node and an output node;
    a current limiter connected to the input node;
    a clock source connected to the charge pump, the clock source is configured to drive the charge pump with clock pulses; and
    a circuit connected to the clock source, the circuit is configured to:
        in a first instance of a measurement period, count a reference number of clock pulses used when driving the charge pump with the current limiter disabled; and
        for each instance of a plurality of additional instances of the measurement period, count a comparison number of clock pulses used when driving the charge pump with the current limiter enabled, the current limiter supplies a different current in each instance of the plurality of additional instances until the comparison number of clock pulses matches, within a specified margin, the reference number of clock pulses.

2. The apparatus of claim 1, wherein:
    the circuit is configured to request the clock source to ramp up a voltage at the output node of the charge pump from an initial level to a final level at a regulated rate during the first instance of a measurement period and each instance of the plurality of additional instances of the measurement period.

3. The apparatus of claim 1, wherein:
    a current passed by the current limiter starts at a minimum level in a first instance of the plurality of additional instances of the measurement period and increases in each remaining instance of the plurality of additional instances of the measurement period.

4. The apparatus of claim 1, wherein:
    the current limiter is in an output path of a current mirror; and
    the circuit is configured to determine an efficiency metric for the charge pump based on a gain of the current mirror when the comparison number of clock pulses matches, within the specified margin, the reference number of clock pulses, and to set a control parameter of the charge pump based on the efficiency metric.

5. The apparatus of claim 4, wherein:
    the control parameter comprises a ramp up rate for the charge pump.

6. The apparatus of claim 1, wherein:
    the circuit is configured to determine an efficiency metric of the charge pump based on the comparison number of clock pulses which matches, within the specified margin, the reference number of clock pulses and to set a control parameter of the charge pump based on the efficiency metric.

7. The apparatus of claim 1, further comprising:
    a current load connected to the output node, the current load is configured to draw a fixed current during the first instance of the measurement period and during each instance of the plurality of additional instances of the measurement period, wherein a current passed by the current limiter starts at the fixed current in a first instance of the plurality of additional instances of the measurement period and increases in each remaining instance of the plurality of additional instances of the measurement period.

8. The apparatus of claim 1, wherein:
    the current limiter comprises a first set of transistors connected in parallel in an input path of a current mirror and a second set of transistors connected in parallel in an output path of the current mirror, each transistor of the first set of transistors and the second set of transistors is connected in series with a respective switch.

9. The apparatus of claim 8, wherein:
a current passed by the current limiter is set according to a ratio of a number of switches in the second set of transistors which are switched on to a ratio of a number of switches in the first set of transistors which are switched on.

10. The apparatus of claim 1, wherein:
the current limiter comprises a transistor with a multi-finger gate, a diffusion region adjacent to each finger of the multi-finger control gate, and a respective switch connected to each diffusion region; and
a current passed by the current limiter is set according to which of the respective switches is switched on.

11. The apparatus of claim 10, wherein:
the transistor comprises a drain connected to a power supply and a source connected to the input node.

12. A method, comprising:
supplying a current from a power supply to an input node of a charge pump while a current load is connected to an output node of the charge pump;
during the supplying of the current from the power supply, driving the charge pump with clock pulses during a first instance of a measurement period without limiting the current supplied from the power supply to the input node;
counting a reference number of clock pulses used when driving the charge pump during the first instance of the measurement period;
supplying a current from a current mirror to the input node of the charge pump while the current load is connected to the output node;
determining a minimum gain of the current mirror which allows for driving the charge pump with a comparison number of clock pulses in another instance of the measurement period which matches, within a specified margin, the reference number of clock pulses; and
setting a control parameter of the charge pump based on the minimum gain.

13. The method of claim 12, wherein:
the control parameter comprises a ramp up rate.

14. The method of claim 12, wherein:
the control parameter comprises a frequency of a clock generator which provides the clock pulses.

15. The method of claim 12, wherein:
the driving the charge pump with clock pulses during the first instance of the measurement period and the driving the charge pump with the comparison number of clock pulses in the another instance of the measurement period, comprise ramping up a voltage at the output node of the charge pump.

16. An apparatus, comprising:
a memory die comprising a plurality of non-volatile memory cells;
a charge pump on the memory die, the charge pump connected to the plurality of non-volatile memory cells and comprising an input node and an output node;
a current mirror on the memory die, the current mirror comprising an input path and an output path, the output path is connected to the input node; and
a circuit connected to the current mirror, the circuit is configured to:
in a first instance of a measurement period, count a reference number of clock pulses used when driving the charge pump with the current mirror disabled;
for each instance of a plurality of additional instances of the measurement period, count a comparison number of clock pulses used when driving the charge pump with the current mirror enabled, the current mirror has a different gain in each instance of the plurality of additional instances, until the comparison number of clock pulses matches, within a specified margin, the reference number of clock pulses;
determine an efficiency metric for the charge pump based on a gain of the current mirror when the comparison number of clock pulses matches, within the specified margin, the reference number of clock pulses; and
set a control parameter of the charge pump based on the efficiency metric.

17. The apparatus of claim 16, wherein:
the gain starts at a minimum level in a first instance of the plurality of additional instances of the measurement period and increases in each remaining instance of the plurality of additional instances of the measurement period.

18. The apparatus of claim 16, wherein:
the specified margin is no more than +/−10%.

19. The apparatus of claim 16, wherein:
the control parameter comprises a ramp up rate.

20. The apparatus of claim 16, wherein:
the control parameter comprises a frequency of a clock generator which provides clock pulses to the charge pump.

* * * * *